United States Statutory Invention Registration [19]

[11] Reg. Number: H926

Mahtook [43] Published: Jun. 4, 1991

[54] RIMFIRE BLANK ADAPTOR KIT FOR M16 RIFLES

[75] Inventor: Raymond A. Mahtook, Green Township, Sussex County, N.J.

[73] Assignee: The United States of America as represented by the Secretary of the Army, Washington, D.C.

[21] Appl. No.: 618,200

[22] Filed: Nov. 16, 1990

[51] Int. Cl.[5] ..... F41A 5/08; F41A 33/00

[52] U.S. Cl. ..... 89/128; 42/77; 89/29

[58] Field of Search ..... 42/77; 89/14.5, 29, 89/128, 180

[56] References Cited

U.S. PATENT DOCUMENTS

| | | | |
|---|---|---|---|
| 3,776,095 | 12/1973 | Atchisson | 89/128 |
| 4,058,922 | 11/1977 | Elbe et al. | 89/29 |
| 4,069,608 | 1/1978 | Jurek | 42/16 |
| 4,220,071 | 9/1980 | Seiderman | 89/128 |
| 4,227,439 | 10/1980 | Gillum | 89/180 |
| 4,515,064 | 5/1985 | Hohrein | 89/128 |
| 4,920,678 | 5/1990 | Brown | 89/128 |

FOREIGN PATENT DOCUMENTS

| | | | |
|---|---|---|---|
| 442513 | 11/1948 | Italy | 89/180 |

*Primary Examiner*—Richard W. Wendtland
*Attorney, Agent, or Firm*—Anthony T. Lane; Michael Sachs; Edward Goldberg

[57] ABSTRACT

A conversion kit for allowing an M16 rifle to fire .22 caliber ball and blank ammunition in semi-automatic and automatic firing modes, comprises a bolt replacement which replaces the standard bolt in the rifle. The bolt replacement moves in the rifle receiver and is engageable with a sear trip bar of the conversion kit. The sear trip bar interacts with an automatic sear of the M16 rifle to permit automatic fire. A spring loaded detent is provided in the conversion for engaging a detent slot in the replacement bolt, to hold the bolt face against a chamber insert, to avoid bouncing of the bolt for automatic and burst firing modes. For the firing of blank cartridges, a shaft is provided in a chamber insert for reducing the diameter of the chamber insert to preclude the feeding of ball cartridges. An orifice in the shaft allows for escaping gases to leave the blank cartridge, but produces back pressure so that the replacement bolt can be cycled for blow back operation.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RIMFIRE BLANK ADAPTOR KIT FOR M16 RIFLES

GOVERNMENTAL INTEREST

The invention described herein may be manufactured, used and licensed by or for the Government for Governmental purposes without payment to me of any royalties thereon.

FIELD AND BACKGROUND OF THE INVENTION

The present invention relates in general to firearms and, in particular to a new and useful adaptor kit for allowing M16 rifles to fire inexpensive .22 caliber rimfire ball and blank ammunition, and to utilize the select fire modes for the M16A1 and M16A2 rifles.

Various military corps use a currently available rimfire conversion kit in 5.56 mm, M16 rifles. This allows the use of inexpensive commercial 0.22 caliber (5.56 mm) rimfire ball ammunition, for reduced range training applications and at substantial costs and savings.

Currently available rimfire conversion kits only allow for semi-automatic firing and cannot accommodate the automatic mode for the M16A1 rifle or the three-round burst mode available in the M16A2 rifle. In operation, the available rimfire conversion kit and rimfire conversion kit magazine temporarily replaces the bolt of the M16 rifle and 30 round 5.56 mm cartridge magazine. The conversion kit operates on the blow back system principle of weapon cycling and is independent of the rifles gas operated cycling system.

SUMMARY OF THE INVENTION

A primary object of the present invention is to provide a rimfire conversion kit which enables the operation of M16A1 and M16A2 rifles in their automatic and burst firing modes.

Another object of the present invention is to provide the conversion kit with a modification which permits the firing of rimfire blanks.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENT

Figure 2:
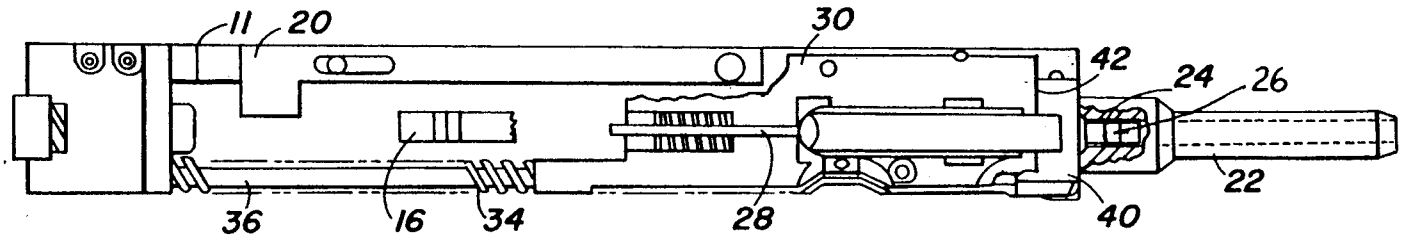
FIG. 2 is a top plan view of FIG. 1, but for firing ball ammunition, with portions cut away.
Figure 1:
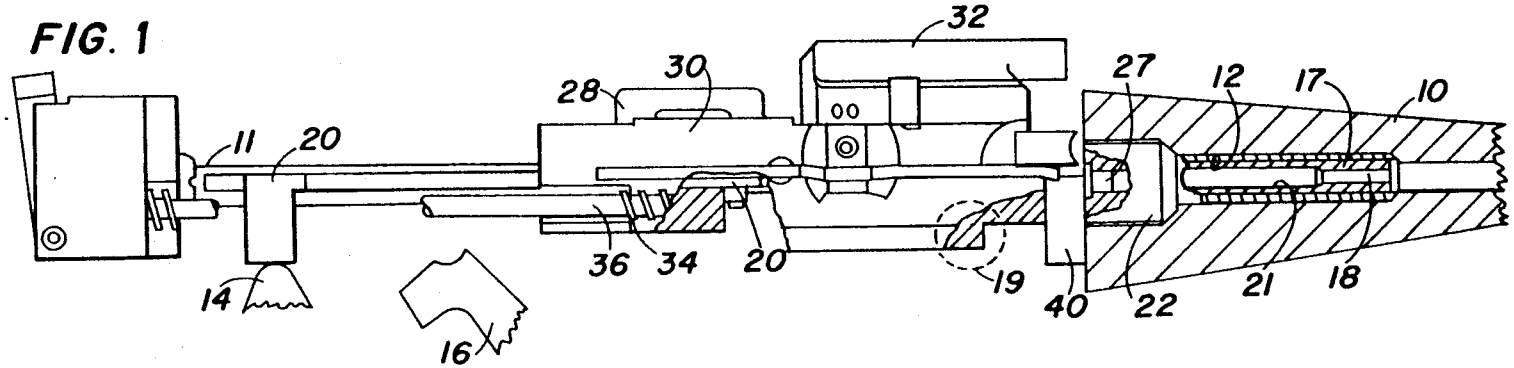
FIG. 1 is a side elevational view of the conversion kit according to the present invention for firing blank, with portions cut away and with fragments of an M16 rifle in which the conversion kit is to be mounted, illustrated.

Referring to the drawings in particular, the invention embodied in FIGS. 1 and 2 comprises a conversion kit for an M16 rifle which has a barrel 10 containing a full size chamber 12 for receiving a full size 5.56 mm NATO cartridge (not shown) having a 5.56 mm ball to be fired during a gas activated firing cycle, through the bore of the barrel.

A standard bolt of the M16 rifle (not shown) is mounted for movement along a linear path in the rifle receiver, for feeding a full cartridge to and firing the full cartridge in the full chamber 12. M16A1 and M16A2 rifles both include an automatic fire sear 14 which is manually movable by a selector lever into the path of movement of the standard bolt. Engagement of the bolt against the sear causes repeated automatic gas activated firing of the rifle, for either continuous fire in the M16A1 or three-round burst fire in the M16A2.

A hammer 16, connected to the rifle receiver is also provided for striking a firing pin in the standard bolt, to discharge the full cartridge.

The conversion kit in the present invention includes a chamber insert 22 which is fixedly mounted in the full chamber 12 and which, as shown in FIG. 2, defines a reduced chamber for seating a reduced size cartridge, for example a 0.22 caliber long rifle rimfire ball cartridge 26. When the rifle trigger (not shown) is pulled hammer 16 is released and strikes a firing pin 28 movably mounted in a replacement bolt 30 of the conversion kit, to discharge the 0.22 caliber cartridge 26.

The conversion kit of the present invention operates on a blow back firing cycle principle rather than the gas cycle of the M16. To this end, a gas plug 32 is included on the replacement bolt 30 and a recoil spring 34 mounted on a spring guide 36, resist the rearward movement of the bolt 30, and returns the bolt 30 to battery for a subsequent firing cycle.

Chamber insert 22 includes an insert face member 40 against which the face 42 of bolt 30 engages.

The area under face 42 on bolt 30 is shaped to strip an upper most cartridge from a magazine, and feed that cartridge to the reduced chamber for semi-automatic and automatic fire.

Replacement bolt 30 slidably rides within the rifle receiver, on a guide rail 11 which is fixed in the receiver, and connected to the chamber insert 22, through the insert face member 40.

The kit also includes a sear trip bar 20 which is positioned in the path of bolt 30 so that as bolt 30 moves back and forth during the firing cycle, bar 20 is moved so that a lower projection of bar 20 strikes the automatic sear 14, for instituting a subsequent firing cycle. This continues in the M16A1 until the trigger is released. In the M16A2, the firing cycle is repeated twice more after the initial stripping, feeding, firing and ejecting cycle to produce a three-round burst.

A rifle bolt which operates on the blow back firing principle, often bounces against the chamber face before settling down in battery. This is acceptable for semi-automatic fire since the bouncing phenomenon is very short lived and would not be perceptible even during rapid semi-automatic fire.

This bouncing phenomenon is not acceptable for automatic fire however, which may take place at very high cycling rates of between 500 to about 1,000 rounds per minute.

Figure 3:
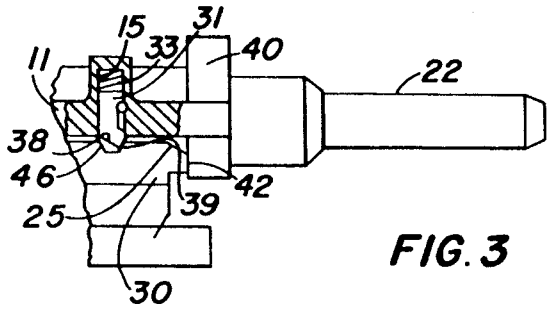
FIG. 3 is a fragmentary view of the conversion kit in FIG. 2, showing detent means for preventing bolt bounce.

To permit the conversion kit of the present invention to operate the M16 rifle in full automatic or three-round burst automatic fire, detent means illustrated in FIG. 3 are utilized.

FIG. 3 (which is shown in an upside down orientation compared to FIG. 1) discloses a pocket 15 which is defined in a forward end of the guide rail 11. Pocket 15 which extends transversely to the direction of movement of the bolt 30, contains a detent 31 which is biased toward the bolt 30 by a spring 33. Detent 31 has a groove extending along part of its length which receives a roll pin or other appropriate stop, to retain the detent in the pocket.

The outer end of detent 31 has a shallow rearwardly facing chamfer 38 and a steep forwardly facing chamfer 39. Chamfer 38 interacts with a shallow chamfer 25 near face 42 for displacing detent 31 into its pocket 14 as the bolt 30 moves forwardly into its battery position.

To avoid rearward bouncing of the bolt 30, detent 31, through the biasing of spring 33, is urged into a detent slot 46 which has inclined forward and rearward walls. The forward wall engages the steep chamfer 39 to retain the bolt face 42 against the insert face member 40. Once the firinq pin 28 is struck by the hammer 16, the blow back force is enough to overcome the inclined engagement between the chamfer 39 and the slot 46, to allow the bolt 30 to move rearwardly for initiating a subsequent firing cycle.

While FIG. 2 illustrates the conversion kit for use with 0.22 caliber ball rimfire cartridges 26, FIG. 1 illustrates a modification which permits the use of 0.22 caliber blank cartridges 27.

To this end, the chamber insert 22 includes a threaded shaft 17 which contains a gas discharge bore 21 having a reduced diameter below the 0.22 caliber diameter of the barrel 10. The diameter of bore 21 is selected to be 0.156 inches and terminates in a 0.101 diameter orifice 18. The diameter of bore 21 is selected to preclude the chambering of 0.22 ball ammunition while still permitting gas to escape from the blank 27. Orifice 18 is provided so that enough back pressure is exerted by firing blank 27 to cycle the conversion kit.

Bolt 30 is also modified by adding material in area 19, by welding, to a 0.080 inch web on the bolt that serves to strip blank cartridges from the magazine. This is necessary for proper feeding of the shorter blank cartridges.

While a known magazine can be used with the conversion kit of the present invention for firing .22 caliber ball ammunition, the magazine must be modified for the semi-automatic and automatic firing of blank cartridges 27.

Figure 4:
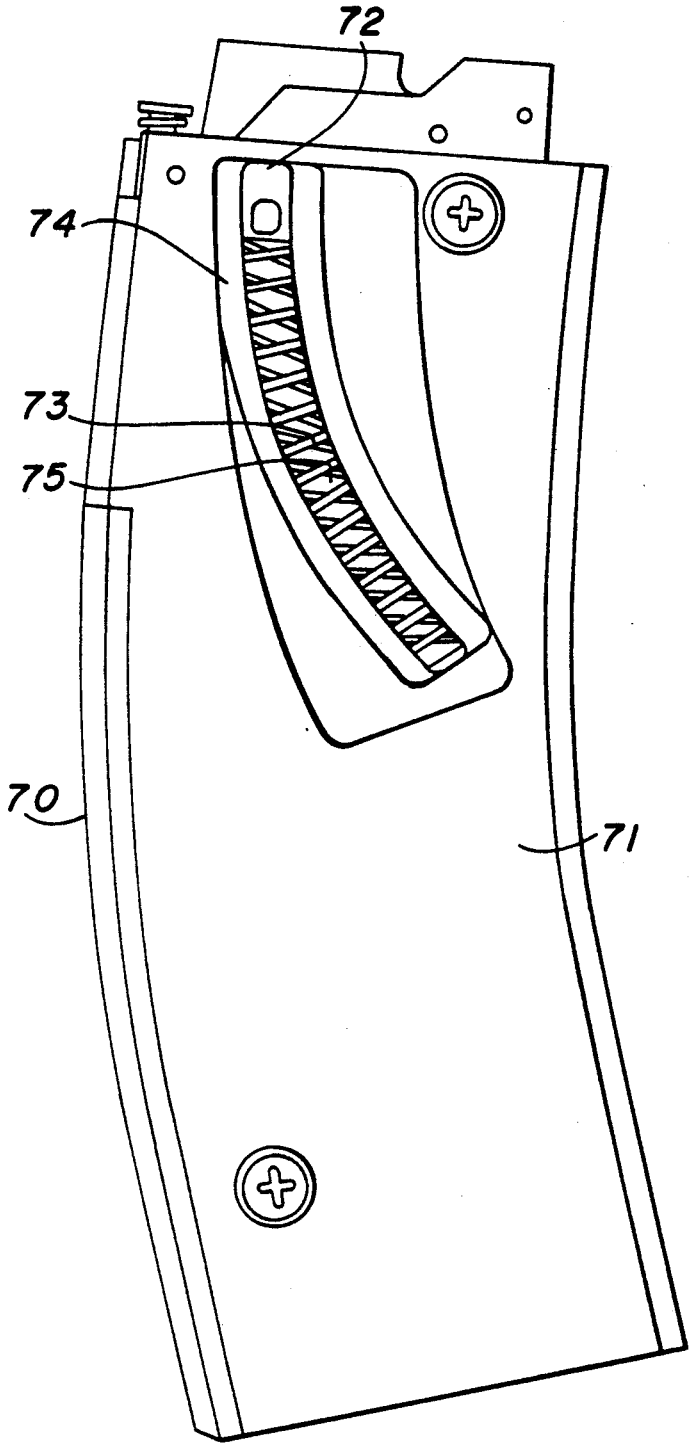
FIG. 4 is a side elevational view of a magazine for use as part of the conversion kit.

FIG. 4 shows a magazine box 70 having a cover 71 which simulates the conventional 30 round 5.56 mm M16 magazine. In this way, Magazine box 70 fits the existing magazine well in the M16 rifle.

A blank magazine box 74 is fixed within the standard magazine box 70. A curved slot 75 in magazine box 74 reveals a rectangular bent magazine spring 73 having a constant pressure characteristic of about 4 pounds per foot, with 18 active coils and a 10° maximum twist in length. Pitch is approximately 0.30 inches. Spring 73 biases a follower 72 which pushes up on a stack of rimfire blank cartridges (not shown).

The arc of blank magazine box 74 is greater (4.82 radius) than the shallower arc (2.84 radius) that would be needed for .22 caliber ball rimfire cartridges. The front or top of the cartridge path has also been designed with an angled recess to guide the angular nose of the blank cartridge into the reduced diameter chamber shown in FIG. 1.

Tests of the present invention have been conducted with number 4 yellow 0.22 caliber necked down star crimped blank power load cartridges. Both M16A1 and M16A2 rifles were utilized in the tests. A variety of noise, cycle rate, fouling, screen perforation and functionality tests were successfully conducted with the invention.

Cycle rates for blank cartridges were 1,030 to 1,050. This was slightly higher than the desired cycle rate of 550 to 920 per minute. No screen perforation occurred with a screen positioned 15 feet from the nozzle when firing blank cartridges. Fouling characteristics were also acceptable, with no reduction and cycling rate being perceived after 500 rounds were fired, and no misfeeding of cartridges occurring.

Minimum noise (report) requirements were also met.

While specific embodiments of the invention have been shown and described in detail to illustrate the application of the principles of the invention, it will be understood that the invention may be embodied otherwise without departing from such principles.

What is claimed is:

1. A conversion kit for a rifle having a full chamber for seating a full size cartridge, a receiver behind the full chamber, a standard bolt movable along a path in the receiver for feeding a full cartridge to and firing a full cartridge in the full chamber to conduct a gas activated firing cycle for the rifle, and an automatic fire sear connected to the receiver and movable into the path of movement of the standard bolt for engagement by the bolt during a firing cycle to produce automatic gas activated firing of the rifle, the conversion kit comprising:

a chamber insert adapted to be fixed in the full chamber and defining a reduced chamber for seating a reduced size cartridge;

a replacement bolt adapted for movement in the receiver behind said chamber insert for feeding a reduced cartridge to and firing a reduced cartridge in said reduced chamber to conduct a blow back activated firing cycle;

a sear trip bar engagable by said replacement bolt and positioned to engage the sear of the rifle when the sear is in the path of movement of the standard bolt so that said sear trip bar engages the sear to produce automatic blow back firing of the rifle with reduced cartridges; and detent means connected to said chamber insert for engaging and momentarily holding said replacement bolt against said chamber insert when said replacement bolt strikes said chamber insert during a firing cycle to prevent bouncing of said replacement bolt from said chamber insert during automatic blow back firing of the rifle.

2. A conversion kit according to claim 1 including a guide rail adapted to be positioned in the receiver for guiding the movement of said replacement bolt, said detent means comprising a pocket defined in said guide rail, a detent mounted for movement in said pocket, in a direction substantially transverse to the direction of movement of said replacement bolt, biasing means for biasing said detent toward said replacement bolt, and a detent slot in said replacement bolt for engagement by said detent when said replacement bolt is against said chamber insert.

3. A conversion kit according to claim 2 wherein said replacement bolt includes a face for engagement against said chamber insert, said face including a shallow chamfer for engagement with said detent to move said detent into said pocket.

4. A conversion kit according to claim 3 wherein said sear trip bar is mounted to said guide, said replacement bolt being engagable with said sear trip bar for moving said sear trip bar into engagement with the sear of the rifle.

5. A conversion kit according to claim 4 including a shaft mounted in said reduced chamber for reducing the effective diameter of said reduced chamber to a diameter for receiving blank cartridges but precluding ball cartridges.

6. A conversion kit according to claim 5 wherein said shaft includes a bore of a diameter to receive a blank cartridge and an orifice which is smaller in diameter than said bore for constricting discharge gases from a blank cartridge when fired by said replacement bolt.

7. A conversion kit according to claim 1 including a shaft mounted in said reduced chamber for reducing the effective diameter of said reduced chamber to a diameter for receiving blank cartridges but precluding ball cartridges.

8. A conversion kit according to claim 7 wherein said shaft includes a bore of a diameter to receive a blank cartridge and an orifice which is smaller in diameter than said bore for constricting discharge gases from a blank cartridge when fired by said replacement bolt.

9. A conversion kit according to claim 1 wherein said replacement bolt includes a face for engagement against said chamber insert, said face including a shallow chamfer for engagement with said detent to move said detent into said pocket.

10. A conversion kit according to claim 9 wherein said sear trip bar is mounted to said guide, said replacement bolt being engagable with said sear trip bar for moving said sear trip bar into engagement with the sear of the rifle.

* * * * *